United States Patent
Wheatley

(10) Patent No.: US 6,543,836 B1
(45) Date of Patent: Apr. 8, 2003

(54) TONNEAU COVER SYSTEM INCLUDING AXIALLY COMPRESSIBLE BOW

(76) Inventor: Donald G. Wheatley, 4451 Ford Rd., Ann Arbor, MI (US) 48105

( * ) Notice: Subject to any disclaimer, the term of this patent is extended or adjusted under 35 U.S.C. 154(b) by 0 days.

(21) Appl. No.: 09/963,938

(22) Filed: Sep. 26, 2001

(51) Int. Cl.7 .................................................. B60P 7/02
(52) U.S. Cl. .............................. 296/100.18; 296/100.17
(58) Field of Search ........................... 296/100.18, 37.6, 296/100.16, 100.15, 100.17, 100.01, 104, 100; 224/404; 160/368.1, 328

(56) References Cited

U.S. PATENT DOCUMENTS

| | | | | |
|---|---|---|---|---|
| 3,936,077 A | * | 2/1976 | Bliek | 296/100 |
| 4,792,178 A | * | 12/1988 | Kokx | 296/100.18 |
| 4,848,824 A | * | 7/1989 | Smith et al. | 296/100.18 |
| 4,902,065 A | * | 2/1990 | Thralls | 296/104 |
| 4,923,240 A | * | 5/1990 | Swanson | 296/100.18 |
| 5,058,652 A | * | 10/1991 | Wheatley et al. | 296/100.18 |
| 5,121,960 A | * | 6/1992 | Wheatley | 296/100.18 |
| 5,251,950 A | * | 10/1993 | Bernardo | 296/100.18 |
| 5,251,951 A | * | 10/1993 | Wheatley | 296/100.18 |
| 5,263,761 A | * | 11/1993 | Hathaway et al. | 296/100.18 |
| 5,301,995 A | * | 4/1994 | Isler | 296/100.17 |
| 5,310,238 A | * | 5/1994 | Wheatley | 296/100.18 |
| 5,322,336 A | * | 6/1994 | Isler | 296/100.18 |
| 5,385,377 A | * | 1/1995 | Girard | 296/100.18 |
| 5,460,423 A | * | 10/1995 | Kersting et al. | 296/100.18 |
| 5,472,256 A | * | 12/1995 | Tucker | 296/100.18 |
| 5,487,585 A | * | 1/1996 | Wheatley | 296/100.18 |
| 5,540,475 A | * | 7/1996 | Kersting et al. | 296/100.16 |
| 5,584,521 A | * | 12/1996 | Hathaway et al. | 296/100.18 |
| 5,655,808 A | * | 8/1997 | Wheatley | 296/100.17 |
| 5,664,824 A | * | 9/1997 | Stephens et al. | 296/100.17 |
| 5,873,210 A | * | 2/1999 | Brumleve | 296/100.18 |
| 5,904,393 A | * | 5/1999 | Yoder | 296/100.17 |
| 6,024,401 A | * | 2/2000 | Wheatley et al. | 296/100.18 |
| 6,257,647 B1 | * | 7/2001 | Ninness et al. | 296/100.18 |
| 2001/0042987 A1 | * | 11/2001 | Getzschman et al. | 296/37.6 |

* cited by examiner

Primary Examiner—Kiran Patel
(74) Attorney, Agent, or Firm—Harness, Dickey & Pierce, P.L.C.

(57) ABSTRACT

A tonneau cover system for covering an area of a vehicle, the vehicle area being bounded by spaced sidewalls each having a top surface. The tonneau cover system including a flexible fabric cover having side edges and a central region bounded by the side edges, the side edges being positionable above the vehicle spaced sidewalls so that the cover can extend over the vehicle area to be covered. A frame having a plurality of elongated rails each having two ends, one of the rails being mounted on the top surface of each vehicle sidewall. A plurality of flanged members coupled to the frame and mounted on the interior of the spaced sidewalls. At least one bowed member flexibly coupled to the flanged members and having spring biased end plungers for varying the length of the bowed member and tensioning the bowed member, where the bowed member supports the flexible fabric cover.

13 Claims, 4 Drawing Sheets

TONNEAU COVER SYSTEM INCLUDING AXIALLY COMPRESSIBLE BOW

FIELD OF THE INVENTION

The present invention relates generally to flexible tonneau covers for vehicles and in particular to an improved bow apparatus for supporting a tonneau cover that employs a spring loaded end to couple to a rail on the cargo sidewalls of a pick-up truck or other vehicle.

BACKGROUND OF THE INVENTION

Tonneau covers are generally defined as any device that can be used to cover a portion of a vehicle. While tonneau covers are generally used to cover convertible cars, boats and trailers, tonneau covers are most commonly associated with pick-up trucks. Both rigid and flexible tonneau covers are available for covering the cargo box of pick-up trucks. The present invention relates to flexible tonneau covers. Flexible tonneau covers for pick-up trucks typically include a rectangular frame made of extruded aluminum rails that are attached to the pick-up truck at the top of the cargo box and provide an attachment point for flanged members on the interior walls of the cargo box. Bowed members are coupled to the flanges or tangs of the flanged members and support a flexible fabric cover which prevents the elements and debris from entering the cargo box. The bowed members impart a tension to the flexible fabric cover that creates an outward curvature of the fabric cover to prevent standing water on the tonneau cover and facilitate runoff of rainwater, melted snow, dust and debris, so as to maintain an attractive appearance and prevent accelerated degradation of the cover material. The fabric is generally a woven material with a vinyl coating. The term "fabric" is used throughout this specification in the broad sense to mean a flexible sheet material that is not limited to a woven material.

In the past, the bowed members were coupled to the tangs on the interior walls of the cargo box by flexing the bowed members and mating or sliding an aperture or slot in the end of the bowed member to a tang. This method was limited by the amount of width variation in the cargo box of a vehicle, as the only method of adjusting the bowed member during installation was to bend it more or less. The variation in bending forces applied to the bowed member would also vary its dimensions when installed. Less bending force would translate into a flatter installation for the bowed member and flexible cover while more bending force would translate into a more bowed surface for the flexible cover. In some cases, a standard bowed member will not fit a non-standard cargo box. For example, a standard bowed member may not be able to reach across the cargo box of a larger pick-up or the bowed member may not be able to bend or flex enough to fit into a smaller cargo box. Thus, predictability and repeatability for the tonneau cover installation is affected by a standard bowed member's lack of adjustability.

SUMMARY OF THE INVENTION

It is an object of the present invention to provide a means to install the bowed members of a tonneau cover in a flexible manner so that variations in cargo box size will not effect the installation of the tonneau cover.

Accordingly, the present invention provides a tonneau cover for covering an area of a vehicle, the vehicle area being bounded by spaced sidewalls each having a top surface. The tonneau cover includes a flexible cover having side edges and a central region bounded by the side edges, the side edges being positionable above the vehicle spaced sidewalls so that the cover can extend over the vehicle area to be covered. A frame is included having a plurality of elongated rails each having two ends, whereby one of the rails is mounted on the top surface of each vehicle sidewall. A plurality of flanged members are coupled to the frame and mounted on the interior of the spaced sidewalls. At least one bowed member is flexibly coupled to the flanged members. The bowed member includes spring biased end plungers for varying its length and tensioning, wherein the bowed member supports the flexible fabric cover.

By providing a spring biased plunger at the end of the bowed member, the bowed member acquires length variability and may accommodate cargo boxes of variable dimensions. Additionally, the spring biased end plunger aids in the installation of the bowed member. The flexing of the bowed member is no longer the primary method of adjusting and installing the bowed member, as the relative travel of the spring biased end plunger with the cargo box may be used to position and mate an aperture in the end of the spring biased plunger to the tangs on the interior of the cargo box.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
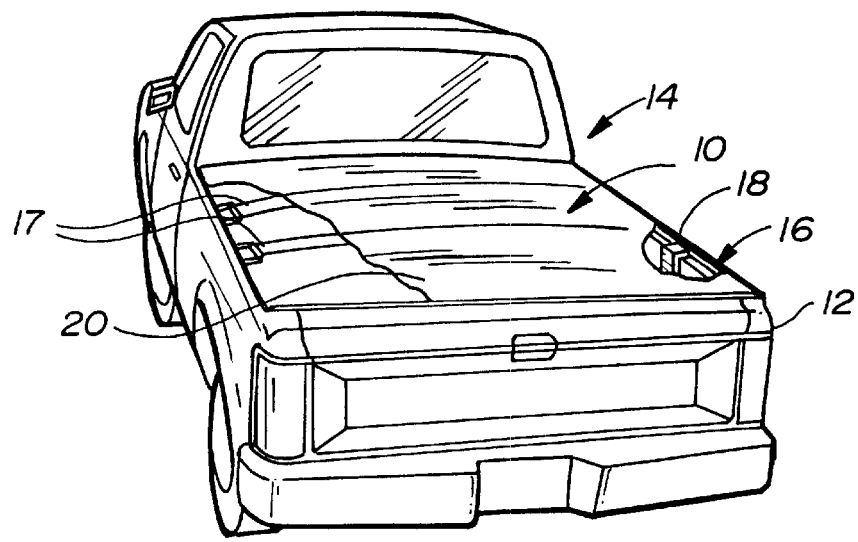
FIG. 1 is a perspective view of a pick-up truck cargo box with a tonneau cover of the present invention installed thereon and partially cut away.

The tonneau cover 10 of the present invention is shown in FIG. 1 mounted upon a cargo box 12 of a pick-up truck 14. The tonneau cover 10 includes a frame 16 and bowed members 17, only portions of which are visible in FIG. 1. The frame 16 is clamped to the upper end of the cargo box 12 by a plurality of clamps 18. A flexible fabric cover 20 is attached to the frame 16 to cover the cargo box 12 and is tensioned in an outward manner by the bowed members 17.

Figure 2:
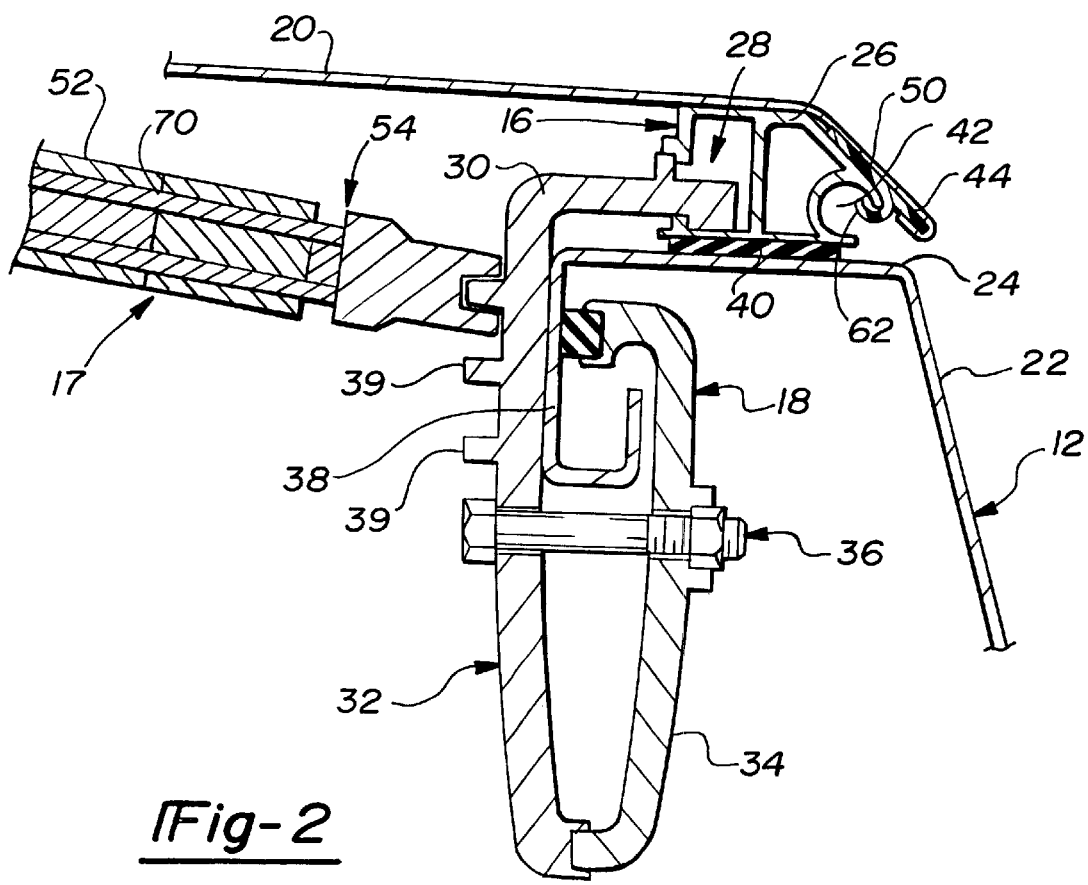
FIG. 2 is a sectional view of a tonneau cover frame and attachment for mounting the tonneau cover to the pick-up truck cargo box.

Referring to FIG. 2, a sidewall 22 of the cargo box 12 has an upper surface 24 upon which the frame 16 is disposed. The frame 16 is constructed of a plurality of elongated rails 26 which are typically joined together at their ends to form a rectangular frame sized to fit on the cargo box 12. The rails 26 are typically made of extruded aluminum and are substantially uniform in cross section along their entire length. The rails 26 have a slot 28 on the inboard side into which an upper portion 30 of a first clamp member 32 is positioned and is slidable along the length of the rails 26. A second clamp member 34 is attached to the first clamp member 32 by a nut and bolt assembly 36 and traps a down turned flange 38 of the sidewall 22 of the cargo box 12 between the clamp members 32 and 34. This secures the clamp 18 to the sidewall 22 of the cargo box 12 and thus secures the tonneau cover frame 16 to the cargo box 12 as well. Foam rubber tape 40 is attached to the bottom of the rail 26, between the rail 26 and the upper surface 24 of the cargo box 12, to provide a seal between the rail 26 and the cargo box 12 and to prevent scratching of the cargo box finish by the aluminum rail 26.

The rail 26 further includes an outboard slot 42 formed by a flange 44 that extends generally away from the interior of the cargo box 12. The flange 44 has a terminal or distal edge. The fabric cover 20 is attached to the flange 44 by a fastener 50.

As illustrated in FIG. 2, the first clamp member 32 includes spaced tangs or flanges 39 for the mounting of the bowed members 17 that support the fabric cover 20. The spaced tangs 39 provide a height adjusting system for the bowed members 17 and thus the fabric cover 20, as the spaced tangs 39 are arranged in vertical fashion. The bowed member 17 includes an intermediate main body 52 and a spring biased end plunger 54. The spring biased end plunger 54 imparts variability to the length of the bowed member 17, thus easing its installation and its ability to fit into cargo boxes of variable sizes.

Figure 3A:
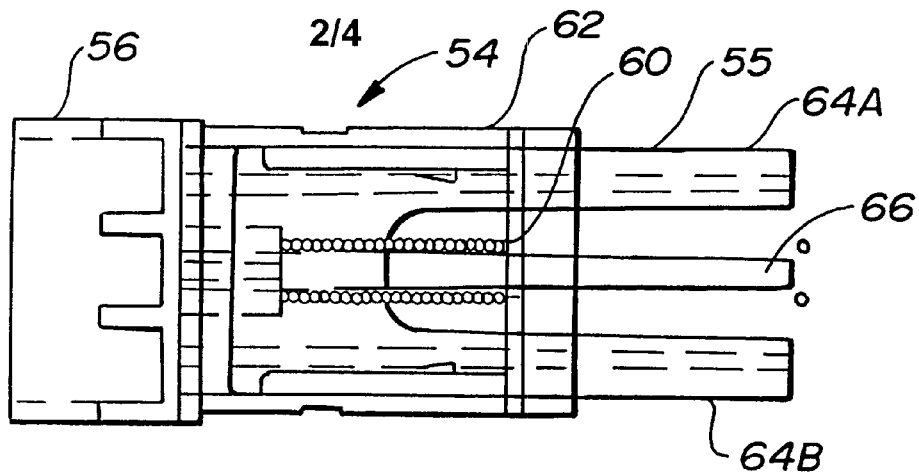
FIGS. 3A–3C are alternate views of a spring biased end plunger of the present invention.
Figure 3B:
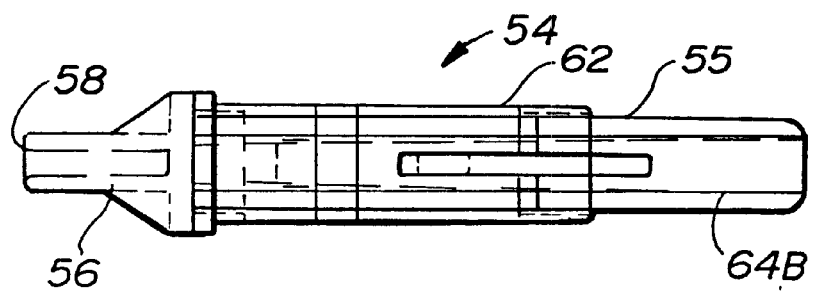
Figure 3C:
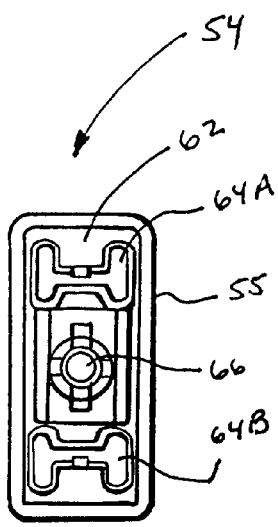

The assembly and operation of the bowed members 17 is best described with reference to FIGS. 3A–3C, 4A–4D, and 5A–5D. FIGS. 3A–3C illustrate different elevational views of the spring biased end plunger 54, including front, rear, top, and side views. The spring biased end plunger 54 includes three main components: a main segment 55 having a tapered end section 56 with a slot 58 configured to couple to the tangs 39, a spring 60 and a collar 62 fit over a section of the main segment 55 and elastically coupled to the main segment 55 by the spring 60. The main segment 55 includes side rails 64A and 64B, and a center post 66, as best seen in FIGS. 4A–4D. The center post 66 provides a mounting for the spring 60 and the collar 62 is fitted over the side rails 64A and 64B, and post 66, coming into flexible contact with the spring 60. In a preferred embodiment of the present invention, the rails 64 have a widthwise I-beam shaped cross section and the collar 62 includes elevated protrusions 68 which mate with the I-beam shaped side rails 64A and 64B, and an aperture 69 which mates with the center post 66 and spring 60. The protrusion 68 slides within the I-beam shaped cross section of the rails 64A and 64B, creating a snug fit between the collar 62 and the main segment 55.

Figure 4A:
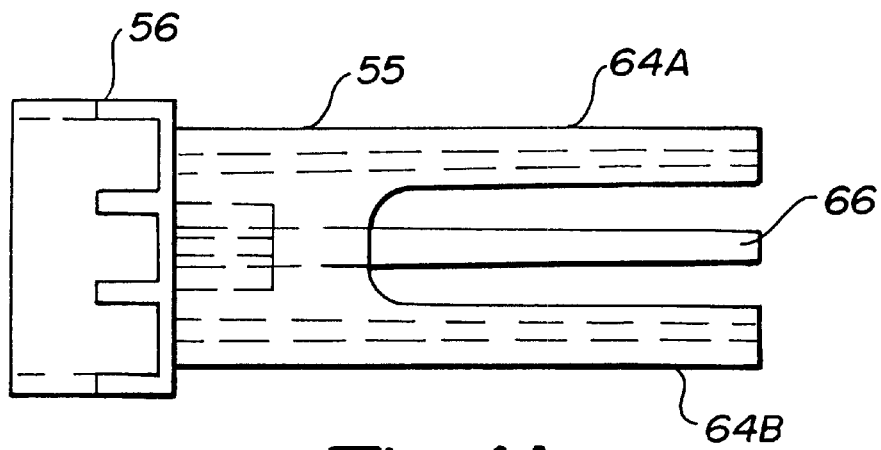
FIGS. 4A–4D are alternate views of a main segment of the spring biased end plunger shown in FIGS. 3A–3C.
Figure 4B:
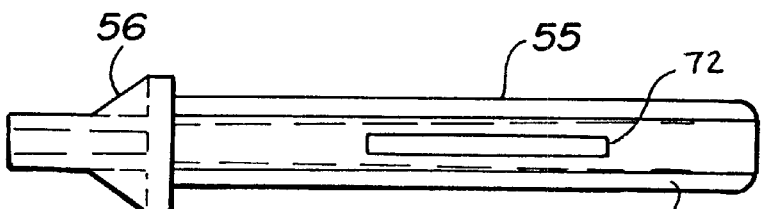
Figure 4C:
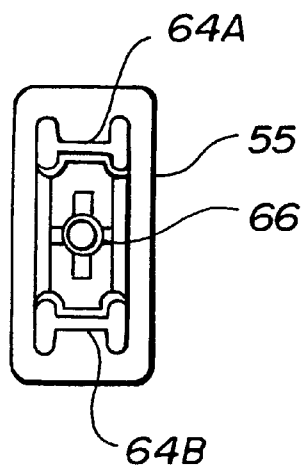
Figure 4D:
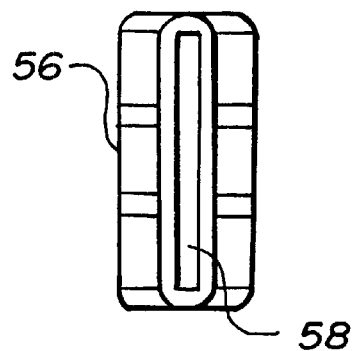
Figure 5A:
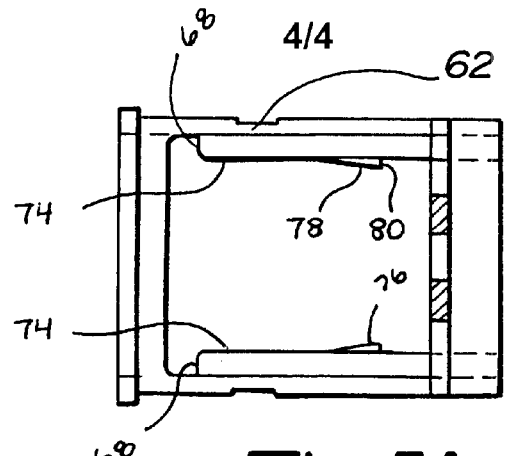
FIGS. 5A–5D are alternate views of a collar of the spring biased end plunger shown in FIGS. 3A–3C.
Figure 5B:
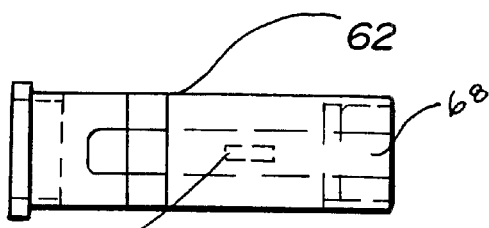
Figure 5C:
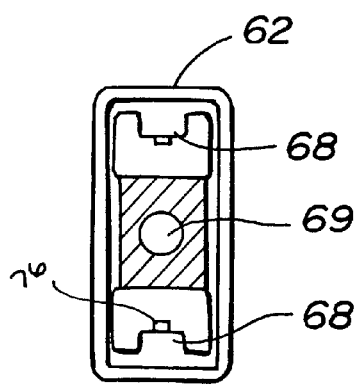
Figure 5D:
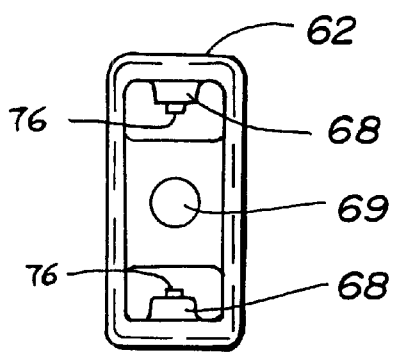

With particular reference to FIGS. 4B and 5A, the side rails 64A and 64B, each include a slot 72 running generally parallel thereto and the elevated protrusions 68 of the collar 62 each include a face 74 having a tab 76 extending therefrom. The tab 76 includes a sloping front face 78 and a straight back face 80. As the collar 62 is slidably assembled onto the main segment 55, the protrusions 68 and the tabs 76 slide along the side rails 64A and 64B until the tabs 76 are seated within the slots 72. Once seated within the slots 72, the tabs 76 prevent the collar 62 from sliding free from sliding engagement with the main segment 55. This is achieved by the straight back face 80 of each tab 76 coming into interference contact with an end portion of the respective slot 72, thereby prohibiting further sliding. In this manner, the interference contact between the tabs 76 and the slots 72, defines a "bottom-out" point, at which the collar 62 may move relative to the main segment 55 in a disassembly direction.

The intermediate main body 52 of the bowed member 17 further includes cavities or passages 70 (as seen in FIG. 2) on both ends that mate with spring biased end plungers 54. The rails 64 of the spring biased end plunger 54 are configured to slidingly engage into the cavities 70 to create a firm coupling between the spring biased end plunger 54 and the intermediate main body 52 of the bowed member 17.

The finished assembly of the bowed member 17 is equipped with the flexible spring biased end plungers 54 on both ends. The spring biased end plunger 54 may be forced into a compressed position and released into a noncompressed position, varying the length of the bowed member 17. This variation in length allows an operator to more easily install the bowed member 17 onto the tangs 39 of a tonneau cover system. For example, the operator may fit one side of the bowed member 17 to the tangs 39 on one side of the cargo box and then compress the spring biased end plunger 54 on the opposite side of the bowed member 17. The shortened bowed member 17 may then be guided into position where the slot 58 of the tapered end section 56 is positioned over a tang 39. Upon removal of the compressive forces on the spring biased end plunger 54, the bowed member 17 will lengthen and the slot 58 will mate with the tang 39, fixing the bowed member 17 into position. This variability in length will enable the bowed member 17 to fit into cargo boxes that vary in size from the standard cargo box dimensions. Furthermore, the spring biased end plunger 54 gives the additional benefit of tensioning the bowed member 17 to fix it into place within the cargo box 12 of the pick-up truck 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tonneau cover system for covering an area of a vehicle, the vehicle area being bounded by spaced sidewalls each having a top surface, the tonneau cover system comprising:

a flexible cover having side edges and a central region bounded by said side edges, said side edges being positionable above the vehicle spaced sidewalls so that said cover can extend over the vehicle area to be covered;

a frame having a plurality of elongated rails each having two ends, one of said rails being mounted on the top surface of each vehicle sidewall;

a plurality of flanged members coupled to said frame and mounted on the spaced sidewalls; and at least one bowed member flexibly coupled to said flanged members and having spring biased end plungers for varying the length thereof, said spring biased end plungers including a main segment and a collar flexibly coupled to said main segment, wherein said bowed member supports said flexible cover.

2. The tonneau cover system of claim 1, wherein said spring biased end plungers include an end having a slot for coupling to a flange on said flanged members.

3. The tonneau cover system of claim 2, wherein said main segment and said collar are flexibly coupled to one another by a spring.

4. The tonneau cover system of claim 3, wherein said spring is mounted about a post extending from said main segment.

5. The tonneau cover system of claim 4, wherein said spring seats between a face of said main segment and a face of said collar for providing a resilient coupling therebetween.

6. The tonneau cover system of claim 5, wherein said main segment includes a plurality of beams extending therefrom, each of said plurality of beams having a width wise I-beam shaped cross section.

7. A tonneau cover system for covering a cargo area of a vehicle, the cargo area being bounded by spaced sidewalls each having a top surface, the tonneau cover system comprising:

a flexible cover having side edges and a central region bounded by said side edges, said side edges being positionable above the vehicle sidewalls so that the cover can extend over the cargo area;

a frame including an elongated rail mounted on the top surface of each vehicle sidewall;

a plurality of clamp members coupled to said rail, said clamp members positioned within the cargo area on the spaced sidewalls; and at least one bowed member flexibly coupled to said clamp members and having at least one compressible end for varying the length thereof, said at least one compressible end including a main segment and a collar slidably coupled to said main segment, wherein said bowed member supports said flexible cover.

8. The tonneau cover system of claim 7, wherein said compressible end further comprises:

a spring engaging said main segment and said collar to create a resilient relationship therebetween, said main segment having an end section including a slot.

9. The tonneau cover system of claim 8, wherein said spring is mounted about a post extending from said main segment.

10. The tonneau cover system of claim 8, wherein said main segment includes a plurality of beams extending therefrom.

11. The tonneau cover system of claim 10, wherein said collar includes a plurality of protrusions for mating with said beams.

12. The tonneau cover system of claim 10, wherein said plurality of beams each have a width wise I-beam shaped cross section.

13. The tonneau cover system of claim 11, wherein each of said plurality of beams include a slot formed therein and each of said plurality of protrusions include a tab formed thereon, such that said tabs mate with said slots.

* * * * *